(12) United States Patent
Horikawa

(10) Patent No.: US 8,042,938 B2
(45) Date of Patent: Oct. 25, 2011

(54) TEMPLE AND PAIR OF EYEGLASSES WITH THE SAME

(75) Inventor: Kaoru Horikawa, Sabae (JP)

(73) Assignee: Charmant Co., Ltd., Fukui (JP)

( * ) Notice: Subject to any disclaimer, the term of this patent is extended or adjusted under 35 U.S.C. 154(b) by 0 days.

(21) Appl. No.: 12/998,267

(22) PCT Filed: Oct. 9, 2009

(86) PCT No.: PCT/JP2009/005280
§ 371 (c)(1),
(2), (4) Date: Mar. 31, 2011

(87) PCT Pub. No.: WO2010/041465
PCT Pub. Date: Apr. 15, 2010

(65) Prior Publication Data
US 2011/0181829 A1   Jul. 28, 2011

(30) Foreign Application Priority Data
Oct. 10, 2008   (JP) .................. 2008-264679

(51) Int. Cl.
*G02C 5/16*   (2006.01)
(52) U.S. Cl. ..................... 351/114; 351/113

(58) Field of Classification Search .......... 351/114, 351/113, 111, 153, 41
See application file for complete search history.

(56) References Cited

U.S. PATENT DOCUMENTS

| | | | | |
|---|---|---|---|---|
| 5,359,370 A | * | 10/1994 | Mugnier | 351/41 |
| 5,666,181 A | * | 9/1997 | Conway | 351/113 |
| 7,246,900 B2 | * | 7/2007 | Fujimoto | 351/113 |

FOREIGN PATENT DOCUMENTS

| | | |
|---|---|---|
| JP | 2004-093741 | 3/2004 |
| JP | 2007-279215 | 10/2007 |
| JP | 2008-058783 | 3/2008 |

* cited by examiner

*Primary Examiner* — Hung Dang
(74) *Attorney, Agent, or Firm* — Flynn, Thiel, Boutell & Tanis, P.C.

(57) ABSTRACT

The present invention provides a temple that has a sufficient elasticity and that can respond to twisting so as not to apply excessive force to a hinge portion or a bracket on the side of a lens portion, when a pair of eyeglasses is worn, and a pair of eyeglasses provided with the temple.
In a temple (A) for a pair of eyeglasses including an elastic compression portion between a hinge portion (3) to a lens portion and an ear pad portion (2), the elastic compression portion (1) is provided with a plurality of linear arch portions (11) and the linear arch portions are arranged side by side.

10 Claims, 9 Drawing Sheets

TEMPLE AND PAIR OF EYEGLASSES WITH THE SAME

TECHNICAL FIELD

The present invention relates to a temple that is a part of a pair of eyeglasses.

BACKGROUND ART

As a typical eyeglass frame, there are one of a full rim type and one of a half rim type.

Then, to the rims to which right and left lenses are attached, temples that abut on the sides of a wearer's head to fix the position of the pair of eyeglasses are attached so as be capable to pivoting inwardly toward the rims.

In an eyeglass frame thus configured, the temples put in their maximum opened states hold portions of a wearer's head portion (in particular, temporal faces) positioned near his/her ear portions to apply pressure thereto, thereby fixing the position of the eyeglass frame.

At this time, in order not to make the wearer feel too tight or otherwise too loose during his/her use, the pressure applied to the head portion by the temples is adjusted by bending the temples forcibly to change the amount of opening thereof.

However, because a typical material for the temples is synthetic resin or metal which are not very high in flexibility, there is a limit to the pressure adjustment by the amount of opening of the temples.

Therefore, the temples are not so elastic that the wearer can get such a good feeling as a gentle touch.

In order to solve such a problem, an eyeglass frame was developed in which an elastic member is arranged between a temple and a bracket so that a moderate pressure is applied to a temporal face by bending the elastic member elastically (see Patent Literature 1).

As an eyeglass frame of another configuration, there is also one where a core bar portion is disposed in a temple (earpiece), as described in Patent Literature 2.

Since this core bar portion is partially bent in an L shape, elastic bending is made possible, so that the temple of this invention can apply a moderate lateral pressure to a wearer.

PRIOR ART LITERATURE

Patent Literature

Patent Literature 1: JP-A-2007-322607
Patent Literature 2: Japanese Utility Model Registration No. 3095082

SUMMARY OF THE INVENTION

Problem to be Solved by the Invention

The temples provided in the eyeglass frame described in the above patent literatures can apply a predetermined pressure in a direction perpendicular to wearer's temporal faces.

However, since human's temporal face is not flat and has certain angles in a vertical direction and in a horizontal direction, even if the temple abut on the temporal face in a direction perpendicular to the temporal face, biased abutment occurs, which results in generation of a component force to cause force in a twisting direction.

However, the temple does not respond to the force by twisting to absorb it, and consequently this twisting force is transmitted to a hinge portion of the temple to cause torsional resistance.

Otherwise, excessive force is also applied to the bracket on the side of the lens portion via the hinge portion.

The wider the temple is, the larger such a tendency becomes.

On the other hand, since the temple is fixed by hooking an ear pad portion around an ear, and the ear pad portion has a shape bent downward and inward three-dimensionally, twisting force still also occurs in the temple in the hooked state around the ear, and excessive force is also applied to the hinge portion and the bracket on the side of the lens portion from the same reason as described above.

The present invention has been developed in order to solve the above problems.

That is, an object of the present invention is to provide a temple that has a sufficient elasticity and that can respond to twisting so as not to apply excessive force to a hinge portion or a bracket on the side of a lens portion, when a pair of eyeglasses is worn, and a pair of eyeglasses provided with the temple.

As a result of accumulation of the present inventor's studies based upon such technical background as described above, the present inventor has found that the above problems can be solved by composing an elastic compression portion that is a part of a temple of a plurality of wire members, and the present inventor has completed the present invention on the basis of the finding.

That is, the present invention lies in (1) a temple for a pair of eyeglasses including an elastic compression portion between a hinge portion to a lens portion and an ear pad portion, wherein the elastic compression portion is provided with a plurality of linear arch portions and the plurality of linear arch portions is arranged side by side.

The present invention lies in (2) the temple according to the above (1), wherein the elastic compression portion is composed of a first linear arch portion and a second linear arch portion with a curvature smaller than that of the first linear arch portion, and the first linear arch portion and the second linear arch portion are arranged side by side.

The present invention lies in (3) the temple according to the above (2), wherein the first linear arch portion is provided with a plurality of first subordinate linear arches and the second linear arch portion is provided with a plurality of second subordinate linear arches.

The present invention lies in (4) the temple according to the above (2), wherein the number of first linear arch portions is more than the number of the second linear arch portion by one.

The present invention lies in (5) the temple according to the above (2), wherein a plurality of the first linear arch portions are arranged parallel to each other and similarly a plurality of the second linear arch portions are arranged parallel to each other.

The present invention lies in (6) the temple according to the above (2), wherein the second linear arch portion is arranged between the first linear arch portions.

The present invention lies in (7) the temple according to the above (3), wherein a junction base at which the subordinate linear arches are joined together is formed in a spherical shape.

The present invention lies in (8) the temple according to the above (1), wherein sectional shapes of the linear arch portions are circular or rectangular.

The present invention lies in (9) the temple according to the above (1), wherein the plurality of linear arch portions are joined together at their central portions.

The present invention lies in (10) a pair of eyeglasses including the temple according to any one of the above (1) to (9).

It should be noted that a configuration obtained by properly combining the above inventions can also be adopted, as long as it answers the object of the present invention.

Effect of the Invention

The elastic compression portion included in the temple for a pair of eyeglasses of the present invention is provided with the plurality of linear arch portions, and the linear arch portions are arranged side by side.

This exerts elasticity in a twisting direction of the temple to absorb excessive force in the twisting direction generated in the temple.

Additionally, the elastic compression portion included in the temple for a pair of eyeglasses of the present invention is composed of a plurality of wire members (the first linear arch portion and the second linear arch portion) of two kinds that are different in curvature from each other and that are arranged side by side.

As a result, this temple can change the amount of bending elasticity according to the shape of the linear arch portion.

Furthermore, this exerts elasticity in a twisting direction of the temple to absorb excessive force in the twisting direction generated in the temple.

Therefore, the twisting force is not transferred to the hinge portion of the temple or a bracket on the side of the lens portion.

It is also possible to change the elasticity of the arch portion by joining a plurality of short wires (subordinate linear arches) together to constitute the arch portion.

Therefore, by changing the number of subordinate linear arches in combination with the curvature of the arch portion, temples that are different in pressure to a temporal surface can be provided.

Furthermore, even if the subordinate linear arches are made of a material that is not high in elasticity, such as iron or aluminum, the arch portion composed of the plurality of subordinate linear arches can exert elasticity equivalent to or more than that of a material having a hyperelastic property.

BRIEF DESCRIPTION OF THE DRAWINGS

FIG. 6A shows a pattern in which one first arch portion and one second linear arch portion are arranged parallel to each other, FIG. 6B shows a pattern in which two first linear arch portions and one second linear arch portion are alternately arranged, and FIG. 6C shows a pattern in which three first linear arch portions and two second linear arch portions are alternately arranged, respectively;

FIG. 7A shows a pattern in which a material for the first linear arch portions and a material for the second linear arch portion are different from each other, and FIG. 7B shows a pattern in which only some first subordinate linear arches are made of different materials;

BEST MODE FOR CARRYING OUT THE INVENTION

Figure 1:
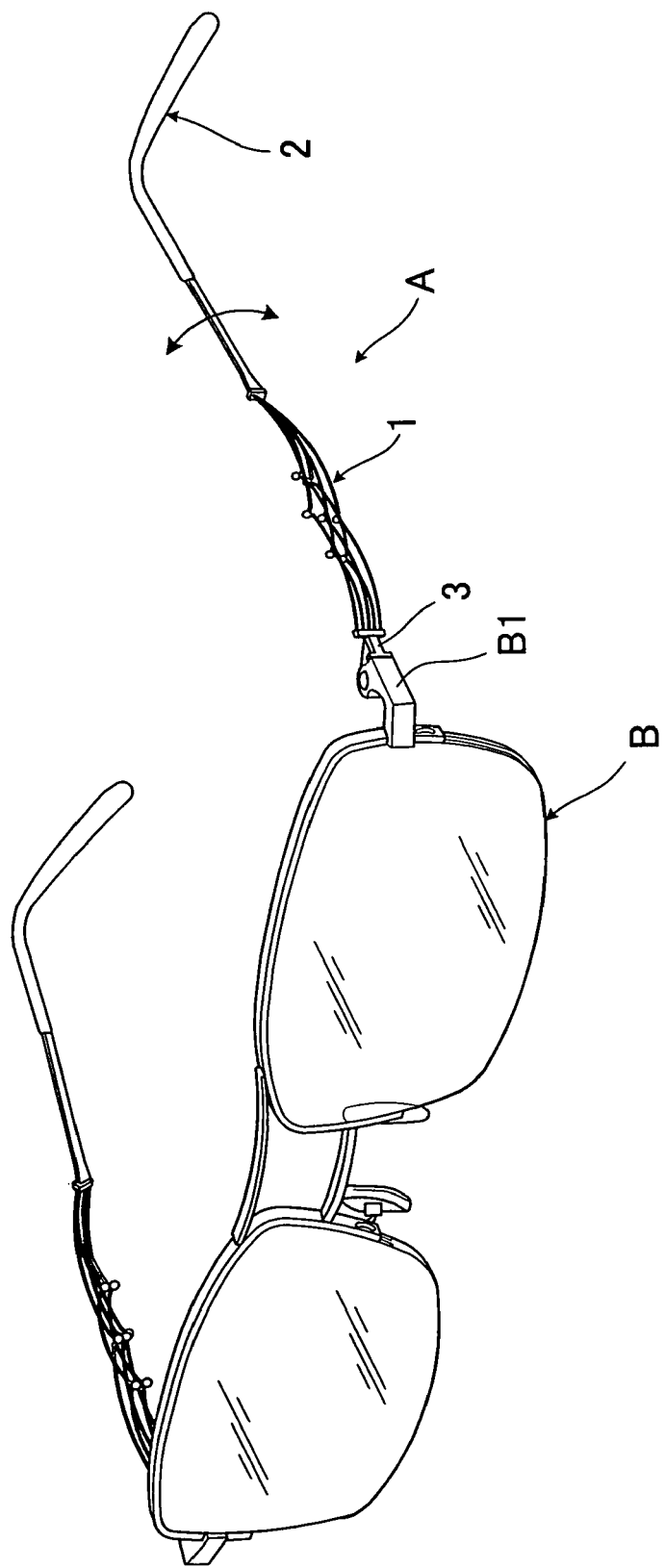
FIG. 1 is a perspective view showing an entire pair of eyeglasses provided with temples in accordance with an embodiment of the present invention.

Hereinafter, referring to the drawings as needed, preferred embodiments of the present invention will be described in detail.

It should be noted that in the drawings identical components are denoted by identical references so that repetitive description will be omitted.

Also, a positional relationship, such as top, bottom, right and left, is based on a positional relationship shown in the drawings, unless otherwise noted.

Furthermore, dimensional ratios on the drawings are not limited to such ratios illustrated.

First Embodiment

FIG. 1 is a perspective view showing an entire pair of eyeglasses provided with temples in accordance with an embodiment of the present invention.

As illustrated, a temple A of the embodiment is a temple for a pair of eyeglasses having an elastic compression portion 1 between a hinge portion to a lens portion B and an ear pad portion 2, and the elastic compression portion 1 is provided with a plurality of linear arch portions. The respective linear arch portions are arranged at intervals (namely, with spaces therebetween).

Since the temple A is provided with the elastic compression portion 1, the position of the pair of eyeglasses can be exactly fixed by applying pressure to a face of contact between the temple A and a temporal face (in particular, the ear pad portion 2 and the periphery of a temple on the temporal face).

The temple A is pivotally attached to the lens potion B, in particular to a bracket B1 provided at both each end of lenses, and the ear pad portion 2 for enhancing fixing force to a head is attached at a rear end portion of the temple A.

The elastic compression portion 1 is located between a hinge portion 3 to the lens portion B and the ear pad portion 2.

Figure 2:
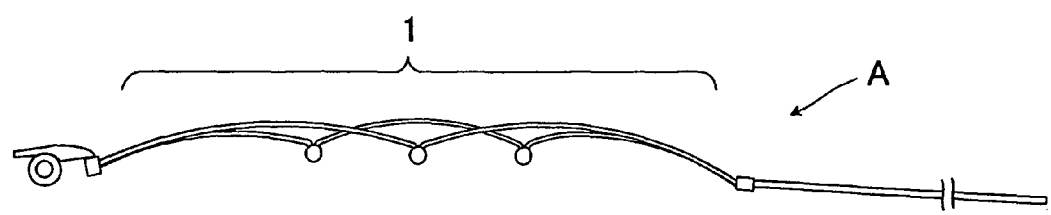
FIG. 2 is a plan view of the temple in accordance with the embodiment.
Figure 3:
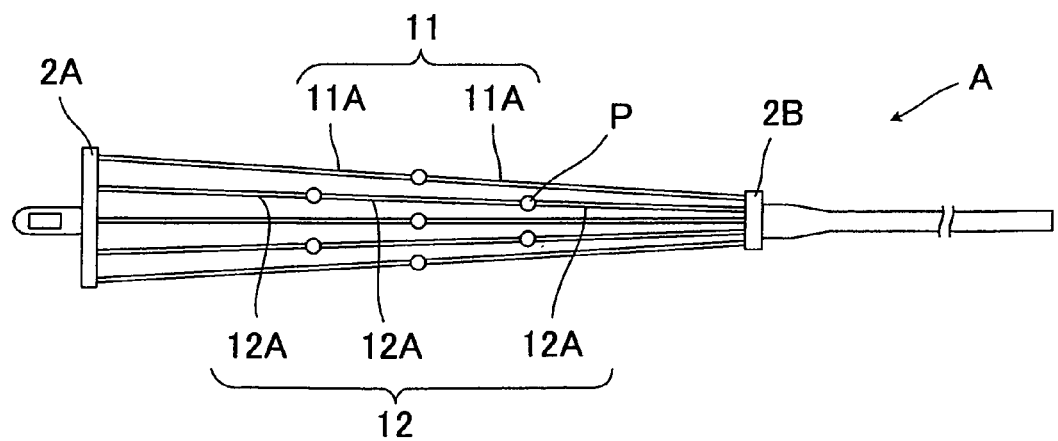
FIG. 3 is a front view of the temple in accordance with the embodiment.

FIG. 2 is a plan view of the temple according to the embodiment, and FIG. 3 is a front view of the temple according to the embodiment.

As shown in FIGS. 2 and 3, in the elastic compression portion 1, a plurality of first linear arch portions 11 and second linear arch portions 12, which are wire members made of metal, are arranged at intervals side by side.

Furthermore, the first linear arch portions 11 and the second linear arch portions 12 are arranged in a spanning manner between a mounting base portion 2A and a mounting base portion 2B arranged at a certain interval.

In other words, both ends of the first linear arch portions 11 and the second linear arch portions 12 configure the mounting base 2A and the mounting base 2B.

Then, subordinate linear arches constituting the respective linear arch portions are in their bent states in a vertical direction, as illustrated.

In this manner, the elastic compression portion 1 made by arranging the plurality of linear members in a spanning manner between the mounting bases 2A and 2B includes a lot of space, and therefore has higher elasticity in a twisting direction than a metal plate having the same width as the elastic compression portion 1 (that is, becomes easy to twist), and also has elasticity in a bending direction (that is, becomes easy to bend).

The elastic compression portion 1 is composed of the plurality of wire members, so that the elastic compression portion 1 bunches up the respective wire members are wholly bunched up to produce a large elasticity in the twisting direction.

Figure 4A:
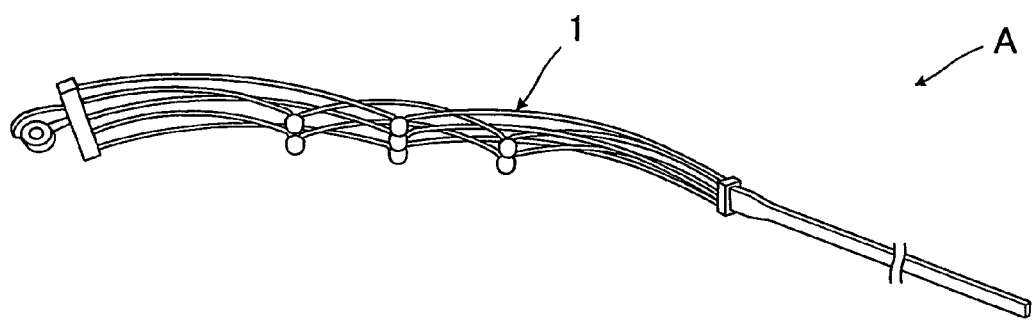
FIGS. 4A and 4B are explanatory views showing the temple in accordance with the embodiment before and after twisted, respectively, FIG. 4A showing the temple before twisted and FIG. 4B showing the temple after twisted.
Figure 4B:
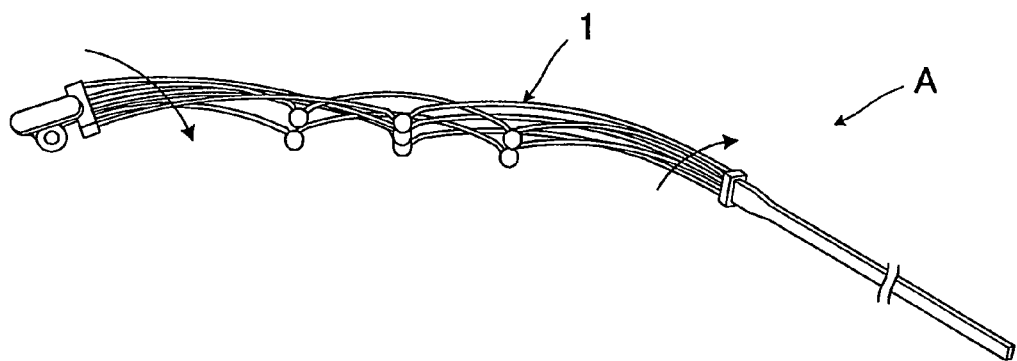

As shown in FIGS. 4A and 4B, when the temple A is twisted, the respective wire members are bunched up in the elastic compression portion 1 and twisted as a whole (FIG. 4A→FIG. 4B).

Since the elasticity in the twisting direction increases, the temple A can exactly fit with the shape of a temporal face.

Therefore, excessive force in the twisting direction generated when the temple A abuts on a temporal face of a wearer is absorbed by the bending deformation.

Accordingly, excessive force is difficult to transfer to the hinge portion 3 which is a junction between the temple A and the bracket B1, or to the bracket B1.

Furthermore, when the temple A (in particular, the elastic compression portion 1) deforms in a twisting manner, the shape of the temple A after deformation thereof generally follows the shape of a temporal face of a wearer, so that lateral pressure is applied evenly to the temporal face.

As a result, the pair of eyeglasses becomes more comfortable to wear.

Figure 5A:
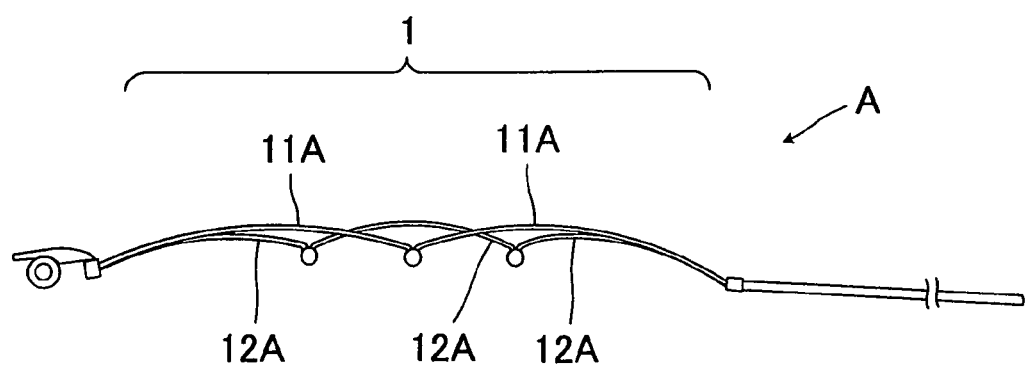
FIGS. 5A and 5B are explanatory views showing the temple in accordance with the embodiment before and after bent, respectively, FIG. 5A showing the temple before bent and FIG. 5B showing the temple after bent.
Figure 5B:
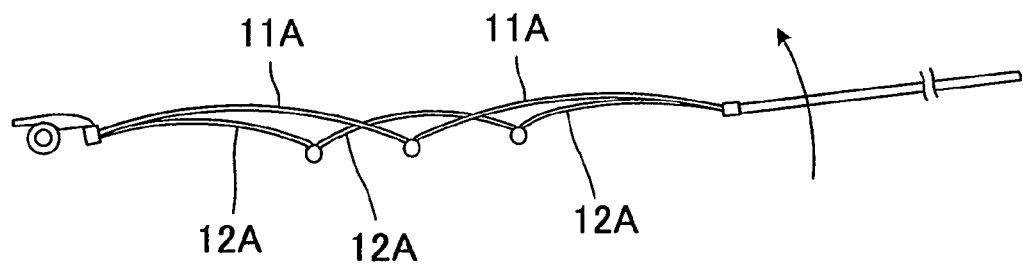

On the other hand, since the elasticity in the bending direction increases, when the pair of eyeglasses is worn by a user, as shown in FIGS. 5A and 5B, it becomes possible to largely bend the elastic compression portion 1 easily into a arch shape (FIG. 5A→FIG. 5B). The temple can gently touch a temporal face.

The elastic compression portion 1 is composed of two kinds of wire members different in curvature (amount of bending) and corresponding to the first linear arch portion 11 and the second linear arch portion 12, and the curvature of the first linear arch portion 11 is larger than that of the second liner arch portion 12.

The elasticity in the twisting direction of the elastic compression portion 1 and the elasticity in the bending direction thereof can be finely adjusted by changing the number of first linear arch portions 11 and second linear arch portions 12 to be attached and the curvatures of the respective linear arch portions.

For example, increasing the number of linear arch portions results in reduction in elasticity in the respective directions such that the elastic compression portion becomes difficult to bend and twist, while decreasing the number of linear arch portions results in increase in elasticity such that the elastic compression portion becomes easy to bend and twist.

Furthermore, increasing the curvature of the linear arch portion results in expansion in movable range of the temple A, while decreasing the curvature of the linear arch portion results in reduction in movable range of the temple A.

It should be noted that, in order to constitute the elastic compression portion 1, at least one each of the first linear arch portion 11 and the second linear arch portion 12 is required.

Therefore, by selecting the number of linear arch portions and curvatures thereof properly, an optimum contact pressure that is not too tight and not too loose can be applied to a wearer's temporal face.

The temple A deforms to follow the shape of a head, so that a wearer can get a more comfortable feeling with the pair of eyeglasses than a conventional one.

At this time, it is preferred that the first linear arch portions 11 and the second linear arch portions 12 are alternately arranged such that the second linear arch portion 12 is arranged between the first linear arch portions 11.

Such alternate arrangement of the first linear arch portions 11 and the second linear arch portions 12 avoids biased elasticity of the elastic compression portion 1.

Furthermore, when the elastic compression portion 1 is formed, it is preferred that the first linear arch portions 11 and the second linear arch portions 12 are arranged at equal intervals.

However, arranging the first linear arch portions 11 and the second linear arch portions 12 intentionally at different intervals can give anisotropy to the elasticity in the twisting direction.

That is, an easy-to-twist direction and a difficult-to-twist direction are generated in the temple A.

Furthermore, though the respective numbers of first linear arch portions 11 and second linear arch portions 12 to be mounted constituting the elastic compression portion 1 are not particularly limited, the second linear arch portion 12 having a smaller curvature (having larger undulation) than the first linear arch portion 11 can be arranged inside by making the number of the first linear arch portions 11 more than the number of the second linear arch portions 12 by one.

The cross-sectional shapes of the first linear arch portion 11 and the second linear arch portion 12 are not particularly limited, and a wire member having a cross-sectional shape of a circle, rectangle, triangle, oval, or the like may be used.

Because the elasticity in each of the directions also varies according to the cross-sectional shape, consideration of not only the number of arch portions or the like but also the cross-sectional shape thereof can achieve more favorable contact pressure.

Now, the elasticity of the elastic compression portion 1 can also be changed by changing the configuration of the linear arch portion.

The first linear arch portion 11 of the embodiment is, as shown in FIG. 1, composed of a plurality of first subordinate linear arches 11A, and similarly the second linear arch portion 12 is composed of a plurality of second subordinate linear arches 12A.

By forming the first linear arch portion 11 and the second linear arch portion 12 into these shapes and mounting them in their curved states to the mounting bases, even an arch portion made of a material, such as iron or aluminum, other than a material having a hyperelastic property can be provided with elasticity equivalent or more than the hyperelastic property.

The subordinate linear arches are joined together by welding, brazing, or the like, and the shape of a junction base P which is a junction therebetween is not limited.

However, a circular shape is preferred in terms of feeling of contact to skin, though it is also possible to adopt a column, oval sphere, cube, or the like in terms of a decorative effect.

Regarding the number of couplings of subordinate linear arches, the number of couplings of first subordinate linear arches 11A is always made larger than the number of couplings of second subordinate linear arches 12A.

This makes the curvature (amount of bending) of the first subordinate linear arch 11A smaller than the curvature (amount of bending) of the second subordinate linear arch 12A.

It should be noted that the curvature of a linear arch portion composed of a plurality of subordinate linear arches means the curvature of one subordinate linear arch.

On the basis of the above-described contents, representative examples of configuration patterns of the linear arch portions of the elastic compression portion 1 will be shown next.

Figure 6A:
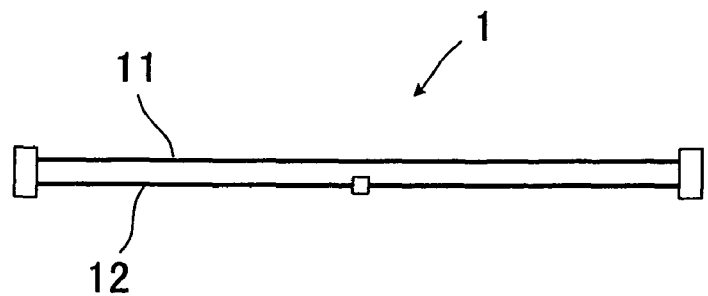
FIGS. 6A to 6C are diagrams schematically showing representative examples of configuration patterns of an elastic compression portion having a different number of linear arch portions.
Figure 6B:
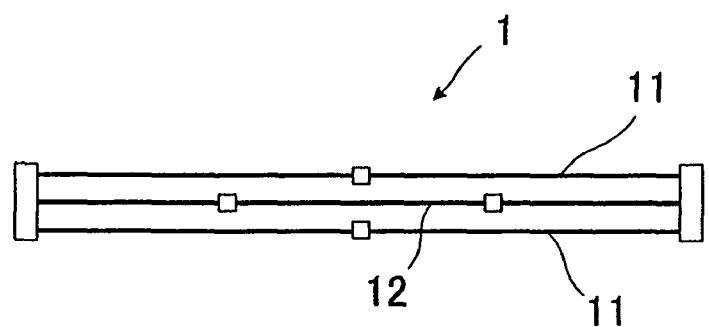
Figure 6C:
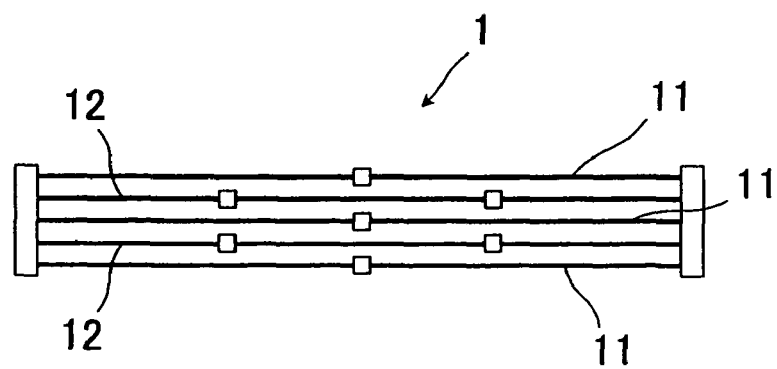

FIGS. 6A to 6C are diagrams schematically showing main configuration pattern examples of the elastic compression portion 1 different in number of linear arch portions.

Incidentally, a rectangular portion represents the junction base.

FIG. 6A shows a pattern in which one first linear arch portion 11 and one second linear arch portion 12 are arranged parallel to each other, FIG. 6B shows a pattern in which two first linear arch portions 11 and one second linear arch portion 12 are alternately arranged, and FIG. 6C shows a pattern in which three first linear arch portions 11 and two second linear arch portions 12 are alternately arranged.

Figure 7A:
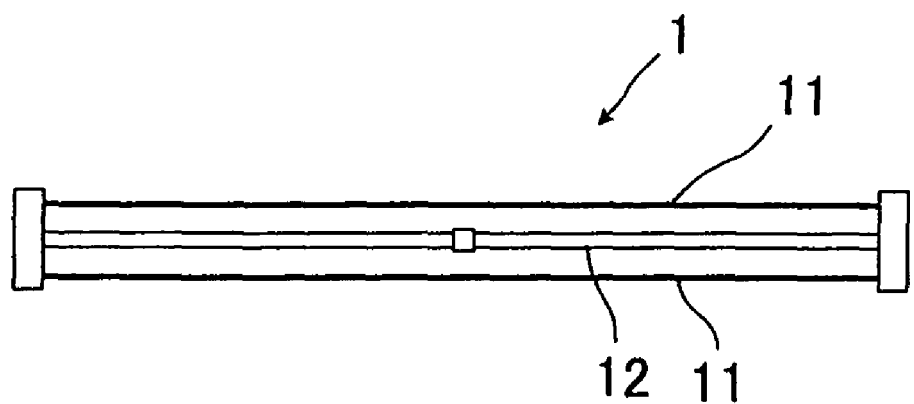
FIGS. 7A and 7B are diagrams schematically showing representative examples of configuration patterns of an elastic compression portion having linear arch portions made from different materials.
Figure 7B:
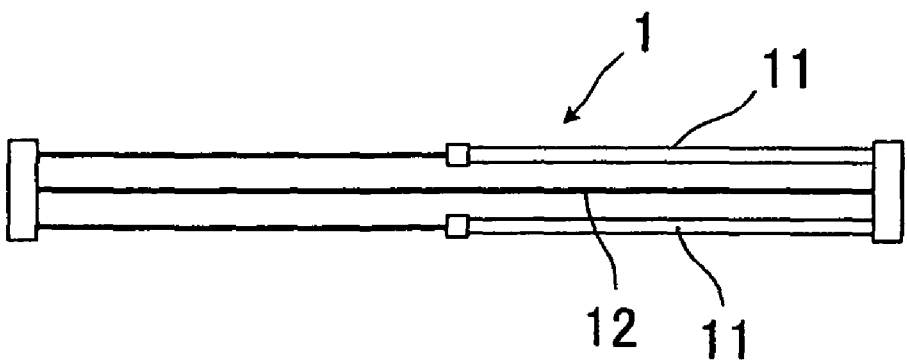

Furthermore, FIGS. 7A and 7B are diagrams schematically showing configuration pattern examples of the elastic compression portion 1 having the linear arch portions made from different materials.

Incidentally, in the figures, different materials are represented by different line thicknesses.

FIG. 7A shows a pattern in which a material for the first linear arch portions and a material for the second linear arch portion are different from each other.

Also, FIG. 7B shows a pattern in which only some first subordinate linear arches is made of a different material, and this pattern provides the elastic compression portion 1 with high and low levels of elasticity in a longitudinal direction of the temple.

As described above, by changing the configuration patterns of the elastic compression portion 1 variously, the elasticity in the twisting direction of the elastic compression portion 1 and elasticity in the bending direction thereof can be changed, and therefore a temple, or a pair of eyeglasses, that applies an optimum contact pressure for each wearer can be provided.

Another Embodiment

The above-described embodiment is such that the elastic compression portion 1 of the temple A is provided with a plurality of linear arch portions and these portions are arranged at intervals, but an embodiment described later is an example in which the linear arch portions are joined together at their central portions.

Incidentally, the linear arch portion shown here is rectangular in cross section.

Figure 8:
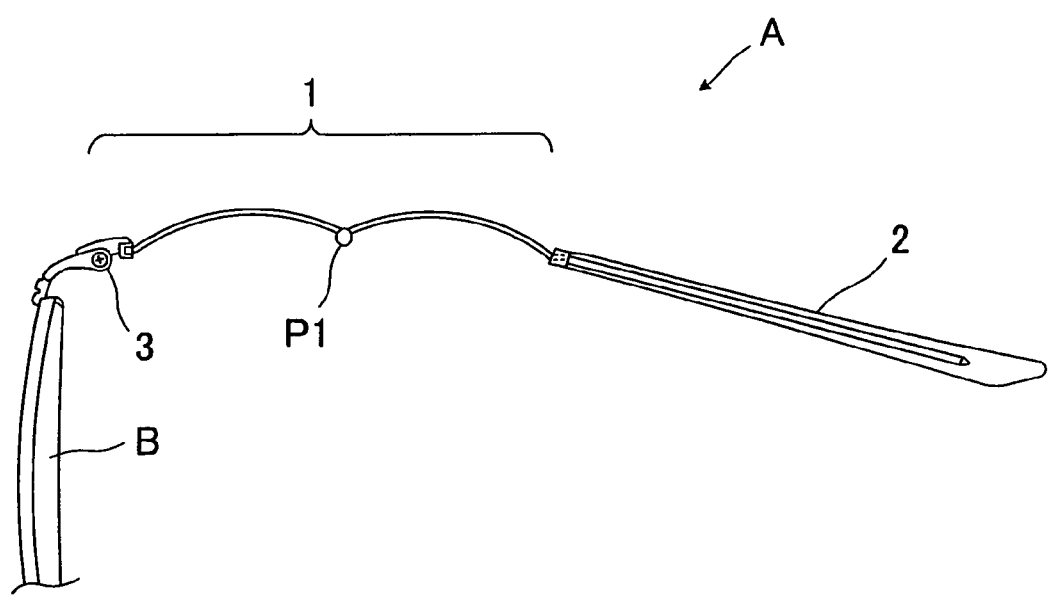
FIG. 8 is a plan view of a temple in accordance with another embodiment.
Figure 9:
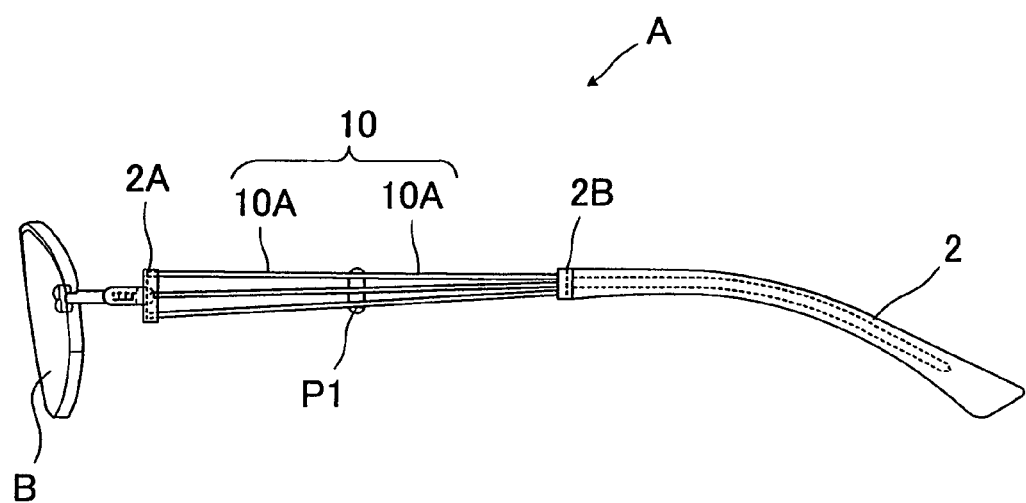
FIG. 9 is a front view of the temple in accordance with another embodiment.

FIG. 8 is a plan view of a temple according to this embodiment, and FIG. 9 is a front view of the temple.

As shown in FIG. 9, in the temple A, three linear arch portions 10 are arranged at intervals (namely, with spaces therebetween).

Then, each of the linear arch portions 10 is provided with two subordinate linear arches 10A.

Then, the linear arch portions 10 are joined together at their central portions.

A junction portion P1 placed at this central portion also serves as the junction base P where the subordinate linear arches are joined together.

In this embodiment, when the temple A is twisted, such an event is prevented from occurring that the interval between the linear arch portions decreases and the temple 1 narrows at its central portion.

In this embodiment, it is possible to place a plurality of junction portions P1 at which respective linear arch portions 10 are joined.

In this case, the junction portion P1 also serves as the junction base P where the subordinate linear arches are joined together.

Hereinabove, the present invention represented by the embodiments has been explained while the embodiments are shown as examples, but the present invention is not limited to the embodiments described above, and may be modified variously.

For example, the above embodiments have shown the case where all the first subordinate linear arches (second subordinate linear arches) are equal in curvature, but obviously it is possible to make the first subordinate linear arches (second subordinate linear arches) different in curvature (amount of bending) from each other.

Furthermore, in an extreme case, the present invention is applied to the case that the curvature of the subordinate linear arch is extremely small.

On the other hand, adopting a configuration where the linear arches can be detached from the junction base for replacement makes it possible for a wearer him/herself to adjust the amount of twisting or the amount of bending of the temple.

Furthermore, since the elastic compression portion is composed of the linear arch portions, it is also a great advantage of the present invention that the temple is given a unique decorative effect by combination of the number of linear arch portions, the shapes thereof, or the junction bases.

INDUSTRIAL APPLICABILITY

The present invention is applicable in the field of a temple and a pair of eyeglasses provided with the temples.

According to the present invention, when the pair of eyeglasses is worn, it is sufficiently elastic and additionally can respond to twisting so as not to apply excessive force to the hinge portion and the bracket on the side of the lens portion.

Therefore, the present invention is applicable not only to a temple but also to a front portion or a rim itself.

DESCRIPTION OF NUMERALS

A temple
B lens portion
B1 bracket
P junction base
P1 junction portion
1 elastic compression portion
10 linear arch portion
10A subordinate linear arch
11 first linear arch portion
11A first subordinate linear arch
12 second linear arch portion
12A second subordinate linear arch
2A, 2B mounting base portion
2 ear pad portion
3 hinge portion

The invention claimed is:

1. A temple for a pair of eyeglasses including an elastic compression portion between a hinge portion to a lens portion and an ear pad portion, wherein the elastic compression portion is provided with a plurality of linear arch portions and the plurality of linear arch portions are arranged side by side.

2. The temple according to claim 1, wherein the elastic compression portion is composed of a first linear arch portion and a second linear arch portion with a curvature smaller than that of the first linear arch portion, and the first linear arch portion and the second linear arch portion are arranged side by side.

3. The temple according to claim 2, wherein the first linear arch portion is provided with a plurality of first subordinate linear arches and the second linear arch portion is provided with a plurality of second subordinate linear arches.

4. The temple according to claim 3, wherein a junction base at which the subordinate linear arches are joined together is formed in a spherical shape.

5. The temple according to claim 2, wherein the number of first linear arch portions is more than the number of the second linear arch portion by one.

6. The temple according to claim 2, wherein a plurality of the first linear arch portions are arranged parallel to each other and similarly a plurality of the second linear arch portions are arranged parallel to each other.

7. The temple according to claim 2, wherein the second linear arch portion is arranged between the first linear arch portions.

8. The temple according to claim 1, wherein sectional shapes of the linear arch portions are circular or rectangular.

9. The temple according to claim 1, wherein the plurality of linear arch portions are joined together at their central portions.

10. A pair of eyeglasses including the temple according to claim 1.

* * * * *